United States Patent [19]

Williams et al.

[11] 4,404,006
[45] Sep. 13, 1983

[54] FILTER DEVICE

[76] Inventors: Charles D. Williams, 31 Harbor Site Dr., Rolling Hills Estate, Calif. 90274; Knut H. Larsen, 7878 S. Poplar, Englewood, Colo. 80112

[21] Appl. No.: 275,279

[22] Filed: Jun. 19, 1981

[51] Int. Cl.³ .............................................. B01D 46/10
[52] U.S. Cl. ...................................... 55/502; 55/497; 55/511; 55/DIG. 5; 210/445
[58] Field of Search ................ 55/486, 487, 491, 502, 55/503, 510, 511, 528, 529, DIG. 5, DIG. 44, DIG. 45, 497; 210/445, 450

[56] References Cited

U.S. PATENT DOCUMENTS

| | | | |
|---|---|---|---|
| 3,293,099 | 12/1966 | Stark | 156/289 |
| 3,372,797 | 3/1968 | Grevich | 206/56 |
| 3,471,019 | 10/1969 | Trasen et al. | 210/445 |
| 3,654,829 | 4/1972 | Anderson | 83/78 |
| 3,666,585 | 5/1972 | Barbehenn et al. | 156/85 |
| 3,719,736 | 3/1973 | Woodruff | 264/156 |
| 3,935,110 | 1/1976 | Schmid et al. | 55/511 |
| 3,969,176 | 7/1976 | Bassett et al. | 156/251 |
| 3,997,386 | 12/1976 | Oshida et al. | 156/306 |
| 4,011,067 | 3/1977 | Carey, Jr. | 55/487 |
| 4,093,437 | 6/1978 | Ichihara et al. | 55/528 |
| 4,115,562 | 9/1978 | Gragson et al. | 55/528 |
| 4,157,967 | 6/1979 | Meyst et al. | 210/449 |
| 4,159,954 | 7/1979 | Gangemi | 210/446 |
| 4,211,661 | 7/1980 | Perry | 55/486 |

FOREIGN PATENT DOCUMENTS 52-23770  2/1977  Japan ................................ 210/445

Primary Examiner—David L. Lacey

[57] ABSTRACT

A filter device having a first housing and a second housing clasping therebetween a filter membrane. The housings are domed or convexly-shaped and have cylindrical hubs. A peripheral flange extends radially away from each of said dome-shaped housings and one of the pheripheral flanges has integrally formed thereon a plurality of ribs of predetermined length laying on a circumference of said one peripheral flange at arcuate locations therearound. The filter membrane is of circular configuration having radial projections extending around the circumference thereof. The ribs fit between the projections so that ultrasonic welding melts the ribs and fuses the two housings together, holding the filter membrane therebetween.

6 Claims, 6 Drawing Figures

FILTER DEVICE

BACKGROUND OF THE INVENTION

1. Field of Invention

The present invention relates to gas filter devices, particularly gas filter devices of the type that utilize a barrier for removal of particulate contaminates.

2. Description of the Prior Art

Filter devices adapted to be placed in an oxygen supply line for use in hospitals or other medical environments in the treatment of various patient systems are well known. Typically, such a filter includes a filter membrane stretched across a housing, the membrane adapted to entrap any suspended particulate matter.

It is also common that the housing of the filter devices of the prior art be separated into two generally dome-shaped or concavely-shaped halves, each half having a hub for connection to an oxygen line. Typically, the two halves are chemically bonded or mechanically joined together, mounting the filter membrane therebetween.

In a blood filter, a continuous circumferential seal between the two housings has been made by use of ultrasonic welding techniques. In U.S. Pat. No. 4,157,967 to Meyst et al, a plurality of filter pads are placed between two housings. The filter pads are joined together at the circumference thereof by heat sealing. The pad is placed between a pair of housings which grasp the pad therebetween. One of the housings has an annular plastic ridge which rests on a flange of the other housing. The sonic energy melts the ridge around the entire circumference of the filter device, forming a seal between the two housings so that the filter may be used for liquids, like blood.

In Gangemi (U.S. Pat. No. 4,159,954) an isolator filter is shown of the same general two-housing construction supporting a filter membrane therebetween. Each housing has a pair of circumferential ribs adapted to align with a like pair of circumferential ribs on the other housing to hold the filter membrane therebetween. The ribs are actually sonically welded to the filter membrane.

It has not heretofore been known to utilize a low energy weld bead or rib, to join the two housings of a filter device directly together. The Meyst patent does weld the two housings together, but requires sufficient time for application of energy to melt a relatively massive flange. The Gangemi patent does utilize ribs that can concentrate sonic energy and therefore be easily melted, but does not directly weld the housings to each other in a desirable hermetic seal.

SUMMARY AND OBJECTS OF THE INVENTION

It is the principal object of the present invention to provide a filter device that can be inexpensively manufactured.

A related object of the present invention is to lower the energy required to manufacture a filter device.

A further object of the present invention is to provide a filter device that positively secures a filter membrane.

In accordance with the objects of the present invention, a filter device includes a first housing and a second housing adapted to support therebetween a filter membrane. The filter device is connected to an oxygen line or other gas line for removal of suspended particulate matter.

The first housing includes a generally dome-shaped outer surface having a peripheral flange extending away therefrom and a hub for connection to the oxygen line. The peripheral flange has a plurality of circumferentially spaced ribs protruding perpendicularly therefrom and away from the concave or dome-shaped surface of the first housing.

The second housing includes a like concave or dome-shaped surface having a hub for connection to the oxygen hose. A peripheral flange extends radially outward therefrom and terminates in a depending skirt or flange adapted to circumscribe the outer edge of the peripheral flange of the first housing.

A filter membrane is composed of three layers of spun-woven polypropylene. The three layers are heat sealed together and then cut out. The resulting filter membrane has a circular face with teeth or projections extending radially away therefrom, the teeth or projections being separated by a plurality of spaces equaling the number of ribs projecting from the first housing. The circular face of the filter membrane has substantially the same surface area as that defined by the dome shapes of the first and second housings.

The filter membrane is aligned so that the spaces of the filter membrane receive ribs of the first housing. The second housing is placed over the first housing and retains the filter membrane. Ultrasonic energy is applied for a set time to the peripheral flanges of the first housing and the second housing which results in melting of the ribs and compression of the second housing onto the first housing in a fused relationship.

DESCRIPTION OF THE PREFERRED EMBODIMENT

Figure 1:
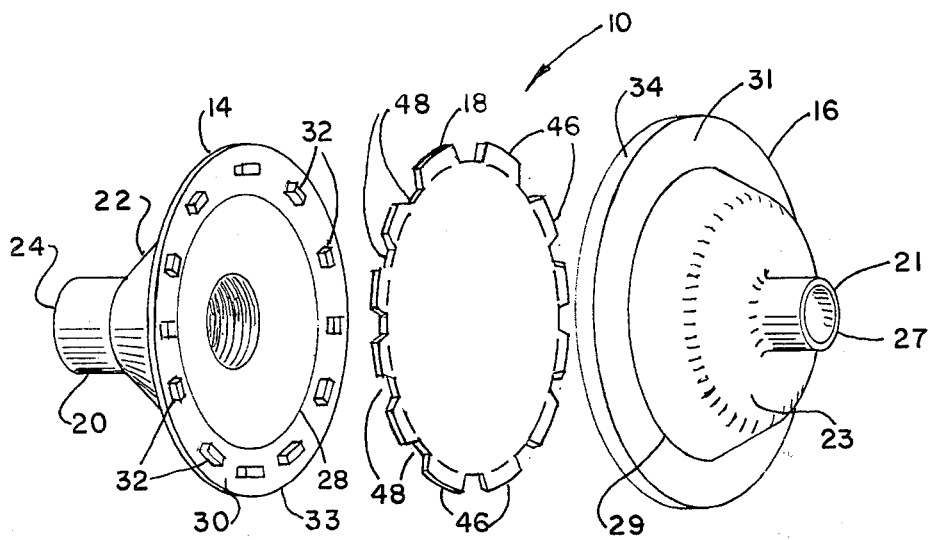
FIG. 1 is an exploded perspective view of the filter device of the present invention.
Figure 2:
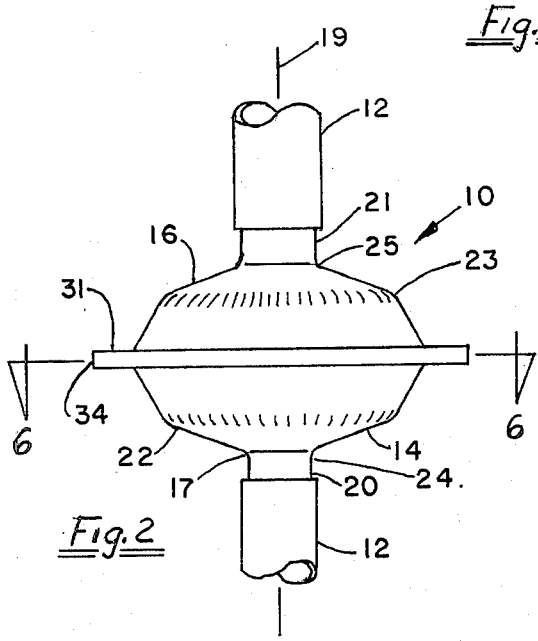
FIG. 2 is a side elevational view of the filter device shown in FIG. 1 installed in an oxygen line.

A filter device 10 (FIGS. 1 and 2) is adapted for placement in an air or oxygen supply line or hose 12. Such a filter device 10 cleanses suspended particulate matter from an oxygen supply to a patient in a medical environment. The filter device 10 includes a first generally domed or convexly shaped housing 14 and a second generally domed or convexly-shaped housing 16 which sandwich a laminated fiber filter membrane 18 therebetween when the housings are joined together, in a manner to be described later. The first housing 14 is a generally the same exterior configuration as the second housing 16, both having a hollow cylindrical hub 20 and 21 respectively, extending coaxially with a central axis 19 (FIG. 2) of said filter device. The hubs 20 and 21 provide means for connection of the filter device 10 to the hose 12 (FIG. 2).

The first housing 14 has a generally dome-shaped outer wall 22 that integrally connects to the hub 20 at an apex 17 of the outer wall 22. The hub 20 defines a small end 24 of the first housing. The other end of the first housing is an enlarged end 28 of circular configuration when viewed along the central axis 19.

A peripheral flange 30 of the first housing 14 extends radially away from the enlarged end 28 in a plane perpendicular to the axis 19. The peripheral flange extends uniformly away from the outer wall 22, terminating in an outer edge 33. The peripheral flange 30 is relatively small compared to the diameter of the enlarged end 28. A plurality of ribs 32 (FIG. 6) extend around the circumference of the peripheral flange. The ribs are spaced at equal arcuate locations around the peripheral flange 30 and are aligned with a circumference lying on said flange. The ribs are integrally formed in the polypropylene plastic first housing 14 so as to extend away from the first housing 14.

The polypropylene plastic utilized for the housings 14 and 16 has been found to optimally fuse (as will be described) when specific physical properties are present. By way of example, polypropylene having a nominal melt flow of thirty-five and a flexural modulus of two hundred twenty thousand pounds per square inch has been found to work well.

The second housing 16 has, as previously stated, a dome or convex shape very similar to the first housing 14. The hub 21 is integrally connected to an outer wall 23 at an apex 25, just as was the case in the first housing 14. The hub 21 establishes a small end 27, while the outer wall 23 terminates in an enlarged end 29.

A peripheral flange 31 of the second housing 16 is similar to the peripheral flange 30 of the first housing, but extends slightly further away from the central axis 19. The extra extension of the peripheral flange allows for a depending skirt 34 to be formed on the second housing 16, which skirt is directed toward the first housing 14, when the two housings are abutted together, in a manner to be described hereinafter. The side of the peripheral flange 31 that faces the first housing is flat and smooth.

Figure 5:
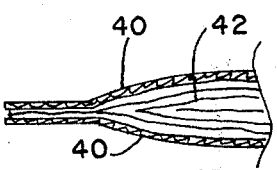
FIG. 5 is an enlarged sectional view of a laminated filter membrane of the filter device shown in FIG. 1.

The filter membrane 18 (FIG. 5) is made of laminated spun-woven polypropylene. Two outer layers 40 are of 0.5 ounce per square yard material. A media 42 having a 200 gram per square yard density is interposed between the two outer layers. The media 42 is a commercially available product manufactured under the trademark "FILTRETE" by 3M Manufacturing Company. Once the filter membrane 18 is configured in the laminated form of an outer layer, the media and the other outer layer, by simultaneously feeding the layers from rollers, the three polypropylene layers are joined by heat sealing the membrane 18 in a circular configuration.

Figure 6:
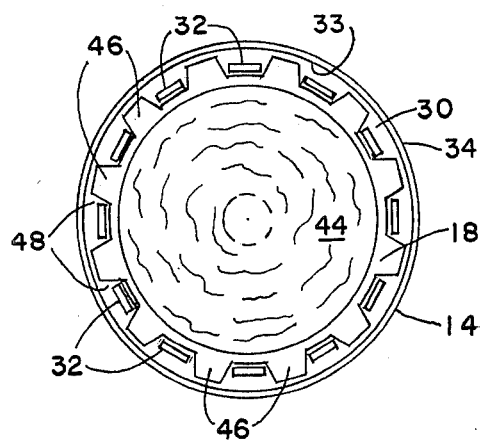
FIG. 6 is a top plan view of the filter membrane positioned on a first housing of the filter device shown in FIG. 1.

Once the outer layers 40 are heat sealed to the media 42, the membrane 18 is cut out in a predetermined shape. The particular configuration of the filter membrane 18, as cut out, is seen in FIG. 6 to include a generally circular face 44 surrounded by a plurality of projections or teeth 46 extending radially away from the face 44. The circular face 44 is of substantially the same area as the enlarged ends 28 and 29 of the first and second housings 14 and 16 respectively. The teeth 46 are equally spaced around the circumference of the face. The teeth are separated by an equal number of spaces 48, the spaces equalling in number the number of ribs 32 of the first housing 14, for a purpose to be seen shortly.

The filter device 10 is assembled by placing the filter membrane 18 on the first housing 14 so the spaces 48 between the teeth 46 are each filled by a rib 32 (FIG. 6). The second housing 16 is placed over the first housing 14 (FIG. 3) interfitting the filter membrane. The ribs 32 contact the peripheral flange 31. The filter membrane is therefore fixed relative to the first housing 14 because the teeth 46 cannot move circumferentially past the ribs 32 contacting the peripheral flange 31.

The loosely fitted together filter device 10 is then subjected to pressure and ultrasonic welding. Ultrasonic welding is accomplished by use of a seventeen hundred watt Sonic Sealer Model 5170 made by the Branson Sonic Power Company of Danbury, Conn. A head (not shown) of the welding device fits over and applies sonic energy to the peripheral flanges 30 and 31.

Figure 4:
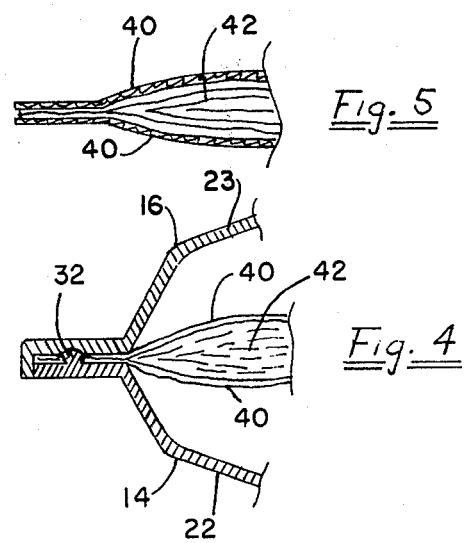
FIG. 4 is an enlarged fragmentary sectional view of the filter device shown in FIG. 1 after joining the two housings together.

The ribs 32 of the first housing 14 are completely melted by application of power for approximately two seconds. Simultaneously, pressure in the amount of 85 psi is applied, which pushes flange 30 flush against flange 31, as seen in FIG. 4. The power applied also melts a portion of the projections 46 of the filter membrane 18, primarily because of the low density materials used in the membrane. The pressure is maintained for a period of approximately two and one half seconds to allow for the cooling of the melted ribs and projections. An hermetic seal is therefore formed completely around the flanges 30 and 31 preventing any leakage of air, or fluid, that may be directed through the filter device 10.

Figure 3:
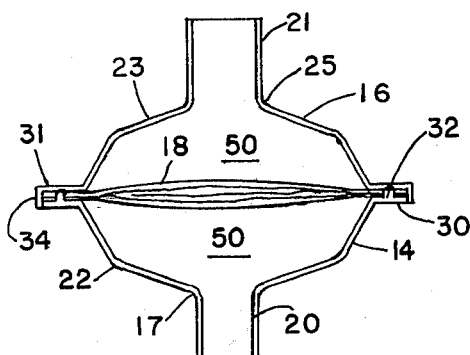
FIG. 3 is a sectional view of the filter device shown in FIG. 1 prior to joining the two housings together.

It will be appreciated that the smaller the area in which ultrasonic energy is concentrated, the more energy per unit area. Therefore, though both the first housing 14 and the second housing 16 are subjected to ultrasonic energy, the housings themselves tend to absorb a great deal of the energy, resulting in a focusing of energy in the ribs 32, and the low density membrane 18. Therefore, the top surface of the ribs 32, which approximates a point contact with the peripheral flange 31, in effect focuses the energy. A relatively small amount of time is utilized for application of energy to the housings. The pressure that is applied during ultrasonic welding pushes the two housings 14 and 16 together. This pressure acts to compress the melted ribs and allows the flanges 30 and 31 to actually pinch the teeth or projections 46 of the filter membrane 18 (FIG. 4). This results in a filter membrane 18 that is tautly held across the hollow interior 50 defined by the two housings 14 and 16. Even relatively high gas pressures will not dislodge the membrane. Higher pressures are in part handled because of the fact that as gas under pressure enters the filter device 10 through one of the hubs 20 or 21, the gas immediately enters the larger area defined by a hollow interior 50 of the two housings, resulting in a pressure drop (FIG. 3).

Although the present invention has been described with a certain degree of particularity, it is to be understood that various other adaptations and modifications may be made within the spirit and scope of the invention.

What is claimed is:
1. A filter device comprising:
   a first housing having gas inlet means and a plurality of spaced ribs extending from a surface of said first housing, each of said ribs positioned on the periphery of said surface of said first housing;
   a filter having a plurality of peripherally located projections which define open spaces therebetween, said open spaces being in alignment with said ribs; and a second housing having gas outlet means and being joined to said first housing with said filter being positioned between said first housing and said second housing said second housing being joined to said first housing by said ribs being fused so that at least portions of said ribs flow through said open spaces to said second housing and seals said first and second housings and the pheriphery of said filter together.

2. The filter device defined in claim 11 wherein said filter comprises polypropylene material.

3. The filter device defined in claim 2 wherein said first and second housings comprise polypropylene material.

4. The filter device defined in claim 1 wherein one of said first and second housings includes a depending skirt.

5. The filter device defined in claim 1 wherein each of said ribs is of a predetermined length and is positioned at one of a plurality of arcuate locations on said surface of said first housing.

6. The filter device defined in claim 11 wheren said filter projections extend radially therefrom.

* * * * *